United States Patent [19]

Badger

[11] 3,980,111

[45] Sept. 14, 1976

[54] FUEL RECEIVER
[75] Inventor: Everett H. Badger, La Habra, Calif.
[73] Assignee: Textron, Inc., Pacoima, Calif.
[22] Filed: Mar. 7, 1975
[21] Appl. No.: 556,253

[52] U.S. Cl. .............................. 141/367; 137/269; 220/259; 285/12
[51] Int. Cl.² .................................. B65B 3/04
[58] Field of Search ............... 137/269, 270; 141/1, 141/84, 98, 198, 325, 326, 327, 367, 392; 220/86 R, 256, 259; 277/235 R; 292/121, 122; 222/533, 536, 543; 285/12

[56] References Cited
UNITED STATES PATENTS
1,016,422  2/1912  Lauritsen ............................ 292/121
1,978,314  10/1934  Lancaster ......................... 220/259 X
3,542,382  11/1970  Hagmann ......................... 277/235 R
3,662,793  5/1972  Calisher et al. ..................... 141/198

Primary Examiner—Richard E. Aegerter
Assistant Examiner—Frederick R. Schmidt
Attorney, Agent, or Firm—Nilsson, Robbins, Dalgarn & Berliner

[57] ABSTRACT

Disclosed is a fueling receiver adapted for connection to a tank. The receiver includes a body member which is affixable to the tank. Pivotally attached to the body member is a nipple member which includes a nipple for receiving a fuel nozzle and a fuel shut-off device operable responsive to a predetermined liquid level in the tank to automatically shut-off the flow of fuel from the nozzle through the receiver and into the tank to prevent over-flow of the tank.

16 Claims, 10 Drawing Figures

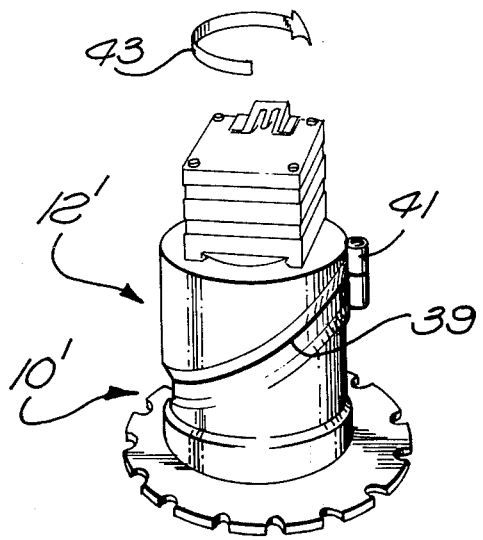
FIG.4.
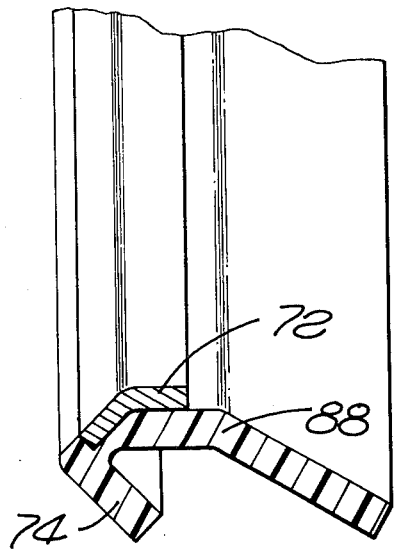
FIG.6.
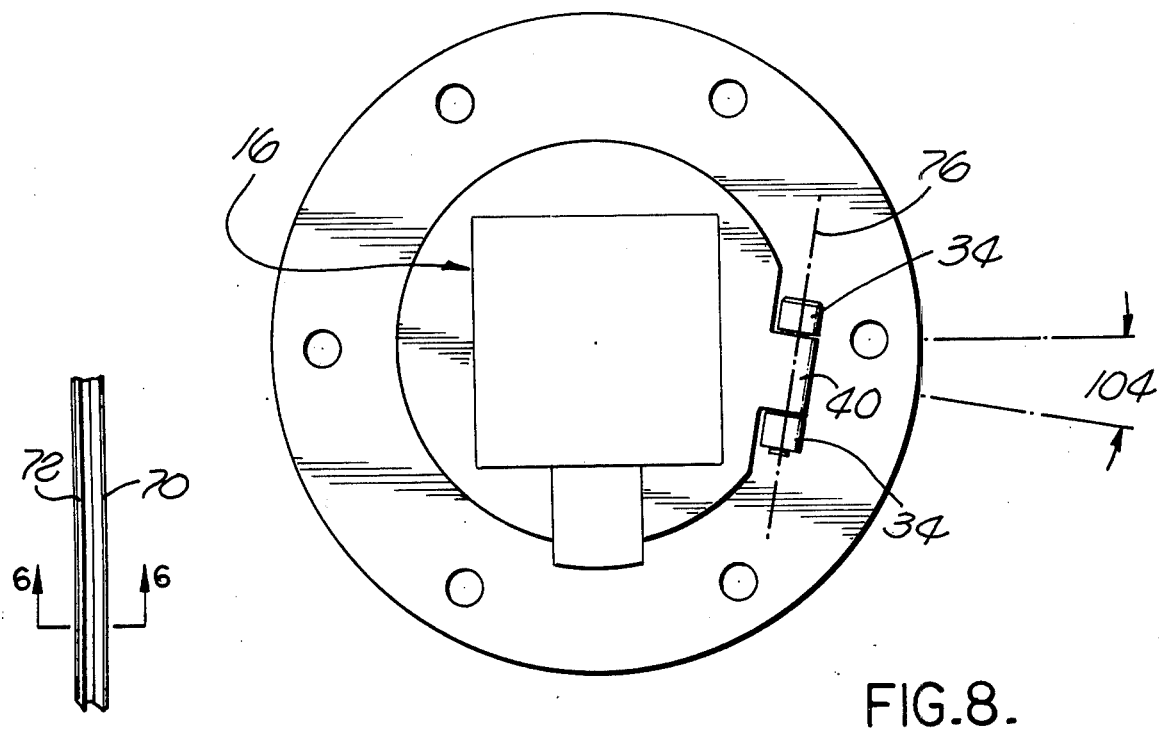
FIG.5.
FIG.8.

FUEL RECEIVER

FIELD OF THE INVENTION

This invention relates to the filling device and more particularly to a receiver for utilization with fuel tanks particularly adapted for utilization with aircraft for use in refueling thereof.

BACKGROUND OF THE INVENTION

Fuel receivers have been known in the art of aircraft refueling for many years. In most instances it is also required that aircraft refueling receivers include some type of automatic shut-off equipment to preclude overflow of the fuel tank during refueling. Such automatic shut-off refueling systems are normally referred to as closed circuit refueling systems. In such systems, fuel is provided under pressure to the receiver by attaching the refueling nozzle to the receiver and relying upon the automatic shut-off provisions to stop the flow of fuel at the proper time. The automatic shut-off apparatus for the most part has been relatively large and cumbersome as well as being complex.

In some instances, while using the same fuel receiver, there is a requirement for a direct gravity feed of the fuel into the system without utilization of the automatic shut-off system. In the known prior art, the bypass of the automatic shut-off apparatus has been accomplished by providing an opening in the wall of the body of the fuel receiver in front of the nozzle attachment nipple. The gravity refueling nozzle is then inserted through the opening directly into the tank and the tank is refueled. The construction of the known prior art refueling receivers requires the opening in the wall of the housing be limited in size. As a result, some standard gravity nozzles utilized in refueling aircraft in the field could not be inserted into the opening. Furthermore, as the result of providing the opening in the wall of the housing of the refueling receiver, positive pressures within the tank often resulted in a splash-back condition wherein fuel exits through the refueling receiver opening during closed circuit refueling thereby creating a hazard to personnel in the immediate area.

The present invention provides a fuel receiver constructed in two parts. The first of these is affixed to the fuel tank and constitutes the body of the fuel receiver. Pivotally attached to the body is a nipple portion which may, in closed circuit position, be sealingly affixed by a latch means to preclude any possible splash-back due to positive build-up of pressure with the tank or otherwise.

When gravity feed is desired, the latch may be released and the nipple portion of the receiver swung away from the body portion to thereby provide an unobstructed opening through which the largest nozzles utilized in the field may be readily inserted for refueling purposes.

SUMMARY OF THE INVENTION

A fuel receiver providing both gravity and closed circuit refueling capability in which there is included a body and a swing-away module pivotally secured thereto, latch means releasably secures the module to the body so that when latched a closed circuit refueling system is provided and when unlatched and the module swung-away, a gravity refueling system is provided.

DESCRIPTION OF THE DRAWINGS

FIG. 4 is a perspective view of an alternative embodiment of a fuel receiver constructed in accordance with the principles of the present invention;

FIG. 5 is an elevational view of a seal utilized in the fuel receiver of the present invention;

FIG. 6 is a fragmentary cross-sectional view taken about the line 6—6 of FIG. 5;

FIG. 8 is a rear elevational view of a fuel receiver in accordance with the present invention in its installed position;

DESCRIPTION OF THE INVENTION

Figure 1:
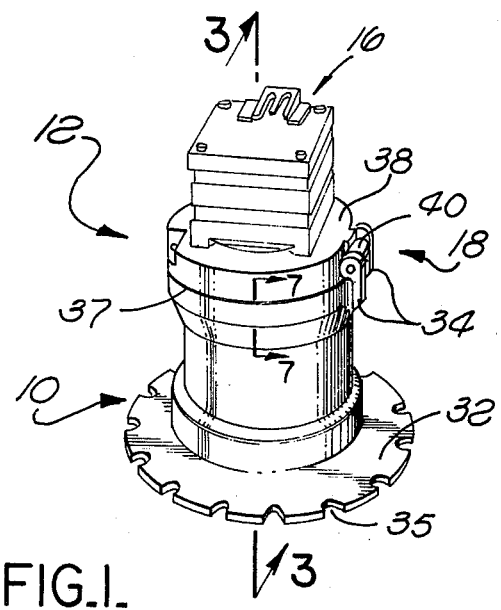
FIG. 1 is a perspective view of a fuel receiver constructed in accordance with the present invention.
Figure 2:
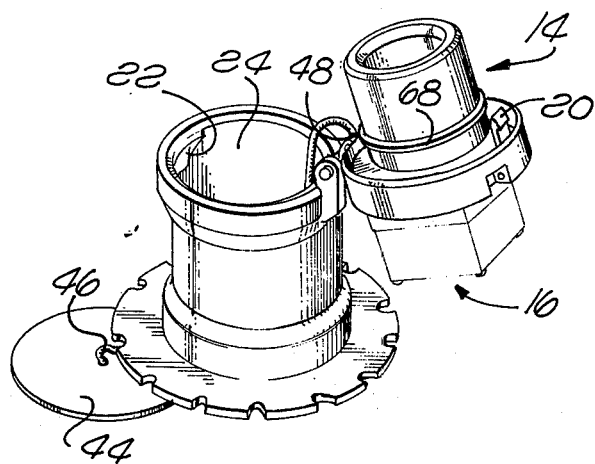
FIG. 2 is a perspective view showing the fuel receiver as illustrated in FIG. 1 with the swing-away module in open position.

A fuel receiver constructed in accordance with the present invention has the capability of fitting through a relatively small diameter opening in a fuel tank and after being secured to the tank may be utilized for refueling purposes. As is illustrated in FIGS. 1 and 2, the fuel receiver includes a housing 10 and a swing-away module 12. The swing-away module includes a nipple means 14 and a shut-off means 16. The swing-away module 12 is pivotally secured to the housing 10 by way of hinge 18. When in the position shown in FIG. 1, a latch finger 20 cooperates with a latch detent 22 to secure the swing-away module 12 in a sealed position with the housing 10.

When the fuel receiver in accordance with the present invention is utilized in a closed circuit refueling system, the swing-away module 12 is latched and secured to the housing 10 as is illustraed in FIG. 1. A closed circuit refueling nozzle is attached to the nipple means 14 and fuel is inserted into the tank in which the receiver is affixed. When the fuel reaches the appropriate predetermined level, the shut-off means 16 functions to stop fuel flow through the receiver and into the tank. Thus overflow of the tank is precluded.

When, as a result of field conditions, a gravity refueling system is required, the latch finger 20 may be released from the latch detent 22 thereby allowing the swing-away module 12 to occupy the position shown in FIG. 2.

When in this position, the exit opening 24 is unobstructed by the swing-away 12 and particularly by the nipple means 14; thus, a relatively large nozzle on the order of 2.75 inches in diameter may be received through the opening 24. Such would clearly meet the requirements as to all known refueling nozzles currently being used in the field. The shut-off means 16 may be any type of shut-off apparatus currently known to the art and, for example, may include apparatus as disclosed in U.S. Pat. No. 3,561,465 which is incorporated herein by reference. Thus, detailed description of the shut-off means will not be provided herein.

Figure 3:
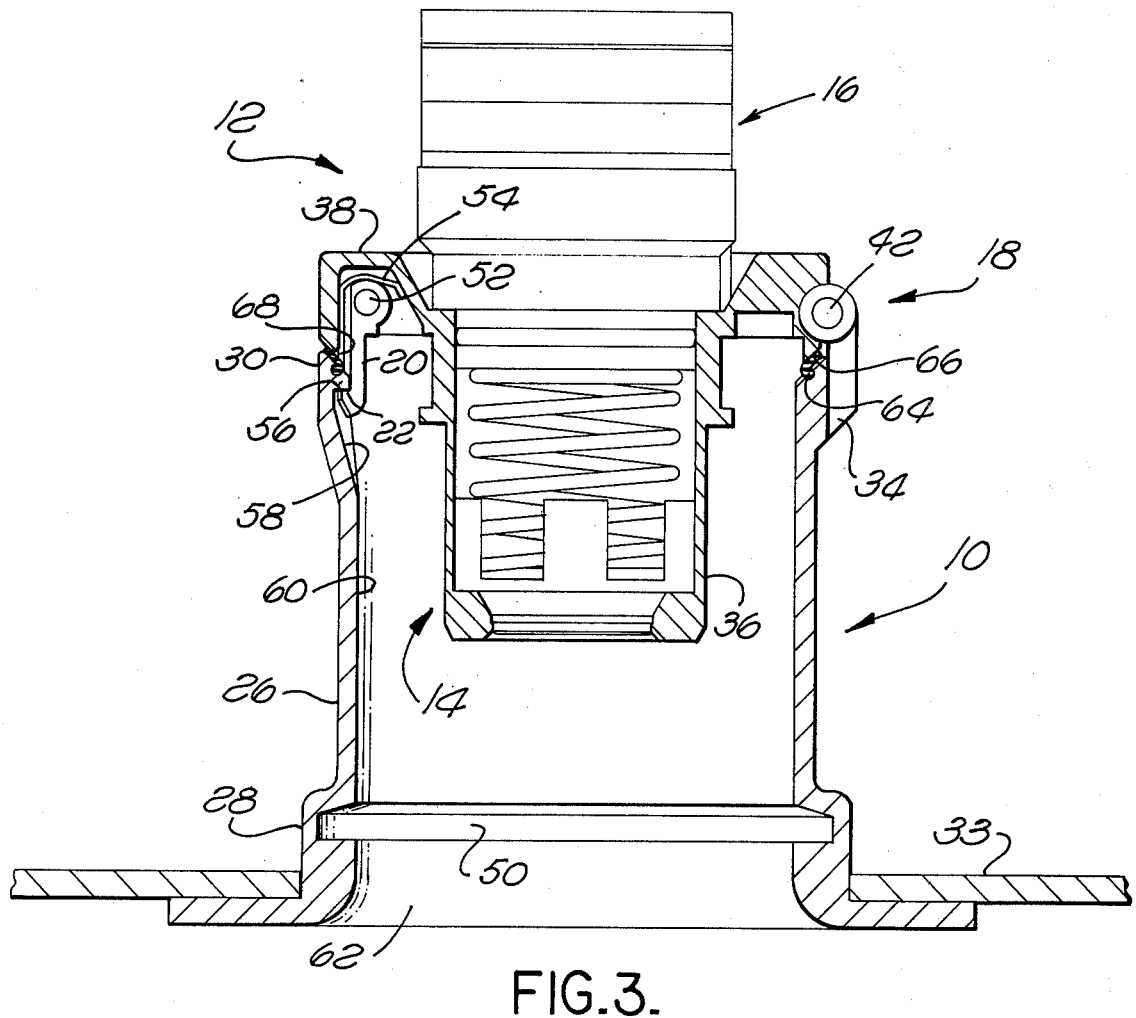
FIG. 3 is a cross-sectional view of the fuel receiver of the present invention taken about the lines 3—3 of FIG. 1.

Referring now more specifically to FIGS. 1 through 3, it may be seen that the housing 10 includes a tubular body 26 having a first end 28 and a second end 30. Extending radially outwardly from the first end 28 of the body 26 is a flange 32. The flange 32 is utilized to attach the fuel receiver to a fuel tank 33 by way of bolts or other fasteners (not shown) which extend through selected ones of the openings 35 provided in the flange 32. A first hinge member 34 is provided at the second end 30 of the body 26.

The nipple means 14 includes an elongated tubular nipple 36 which is received within the tubular body 26 when the swing-away module 12 is in the closed position. In such position, the tubular nipple 36 extends from the second end 30 toward the first end 28 of the tubular body 26. The nipple means 14 also includes a central support base 38 having a second hinge member 40. Means such as a hinge pin 42 is provided to pivotally interconnect the first and second hinge members 34 and 40, respectively, thereby to permit the swing-away module to be pivoted to a position as illustrated in FIG. 2.

Although in the preferred embodiment of the invention the swing-away module is pivoted about an axis transverse to the longitudinal axis of the tubular body 26, it should be understood that, depending upon the position of the nipple 36, with respect to the parting line 37 between the swing-away module 12 and the housing 10, the axis for pivoting may be parallel to the longitudinal axis of the body 26, thus creating a rotational type of pivot as opposed to a swinging type of pivot. A structure of such an alternative type is perspectively illustrated in FIG. 4. As is therein shown, all elements of the fuel receiver are the same except the parting line 39 is disposed at an angle other than 90° with respect to the longitudinal axis of the housing 10 thereby defining an ellipse instead of a circle as does the parting line 37 of FIG. 1. A hinge means 41 is disposed parallel to the longitudinal axis of the housing 10' whereby the module 12' is swung-away by pivoting in the direction illustrated by the arrow 43. In either the embodiment of FIGS. 1 through 3 or FIG. 4 the nipple means will be removed from the tubular body 26 thereby to provide substantially unrestricted access to the tank through the tubular body 26.

A closure cap 44 is attached by way of a lanyard 46 which passes through the tubular body 26 to the flange 38 on the nipple means 14. As is illustrated, the lanyard is attached to the flange at a point 48 adjacent the hinge means 18. It will be recognized by those skilled in the art that the lanyard 46 provides a dual function. That is, the cap 44 is secured by the lanyard 46 to the receiver. Thus, when removed from the housing 10 for refueling purposes, the cap 44 is readily available to reclose the receiver when refueling has been completed. Also, the lanyard 46 is utilized to return the swing-away module 12 to its closed and latched position subsequent to gravity refueling. Such is done by applying force to the lanyard 46 which, as a result of the offset of the attachment point 48 from the hing 18, will pivot the swing-away module 12 about the hinge pin 42 and into latched and sealed configuration. A groove 50 is provided in the body 26 adjacent the first end 28 for utilization in securing the cap 44 to the body 26.

The latch finger 20 is pivotally secured about the pin 52. The spring 54 engages the finger 20 so that the ear 56 is continuously urged into latching engagement with the latch detent 22 formed by providing a recess 58 in the inner wall 60 of the tubular housing 26 near the second end 30 thereof. It will be recognized by those skilled in the art that the latch ear 56 is easily disengaged from the latch detent simply by inserting a screw driver or similar article into the body 26 and lifting the ear 56 free of the recess 58. Such occurs since the latch finger, when the swing-away module 12 is in its secured position, extends toward the first end of the body 26 thus exposing the ear 56 to the entrance opening 62 of the fuel receiver housing.

The body 26 at the second end 30 thereof defines a groove 64 continuously therearound. Seated within the groove 64 is a seal means 66. A lip 68 is provided at the terminus of the central support base 38. As can be seen, the lip 68 is formed by a surface which is chamfered thereby providing a surface which is disposed at an angle other than 90° with respect to the longitudinal axis of the tubular body 26. As a result, the lip 68 cooperates with the sealing means which includes a resilient member so as to seal the swing-away module to the housing 10 in such a manner that even though positive pressure may build up within the tank to which the receiver is attached, there will be no leakage through the parting line between the housing and the module.

Figure 7:
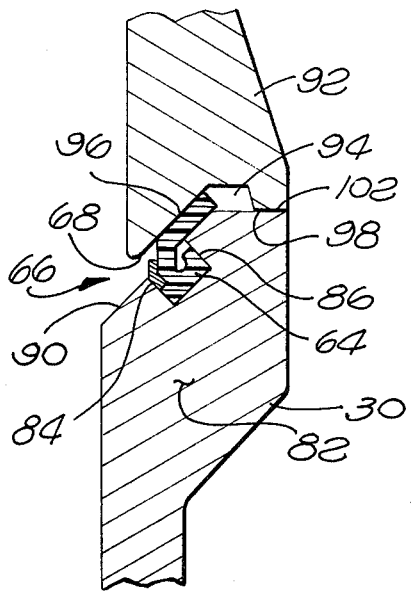
FIG. 7 is a fragmentary view taken about the lines 7—7 of FIG. 1 illustrating in further detail the seal utilized in the fuel receiver of the present invention.

By reference to FIGS. 5 through 7, a better understanding of the sealing means will be received. As is shown in FIGS. 5 and 6, the sealing means includes a resilient member 70 carried by a metallic ring 72. The resilient member 70 includes a flange 74 which, along with the metallic ring 72, is received within the continuous groove 64 to effectively hold the seal in position. As is illustrated, particularly in FIG. 7, the second end 30 of the body 26 includes an enlarged edge 82 which defines th groove 64. The groove 64 is rectangular and receives the metallic ring 72 against one wall 84 thereof while the flange 74 is squeezed into the groove 64 and seats against the opposite wall 86. The balance of the resilient member 70 extends outwardly from the groove and as a result of the bend 88 in the general direction of the surface 90 when the module 12 is closed the terminus of the central support base is brought into engagement with the second end 30. As is illustrated the terminus is enlarged at 92 and is relieved at 94 to define the lip 68. As the lip 68 engages the member 70, the member 70 is squeezed between the surface 90 and 96 to effect the desired seal. To preclude damage to the seal, the enlarged portions 82 and 92 include surfaces 98 and 102 respectively which engage each other and function as stop means limiting travel of the module 12 toward the housing 10. As will be noted, because of the bend 88, the seal is retained in such a position that even during gravity feed system operation, the seal is substantially out of danger of being damaged by the refueling apparatus. However, in the event that the seal is damaged, the specific construction utilized herein allows the ring and resilient seal to be removed from the groove 64 and a new seal inserted therein.

By referring now to FIG. 8, the fuel receiver in accordance with the present invention is shown in its preferable installed position with a tank on an aircraft. As is illustrated, the fuel receiver is installed in such a manner that the hinge pin axis 76 is displaced from the vertical by an amount on the order of 10°. Such a position places the pivot point of the module below horizontal by an angle of approximately 10° as shown at 104. This displacement causes the module 12 to swing from the closed to the open position, when installed, by gravity alone. That is, the operator need not push, shove or otherwise impart force to the module 12 in order to effect opening to the position shown in FIG. 2.

Figure 9:
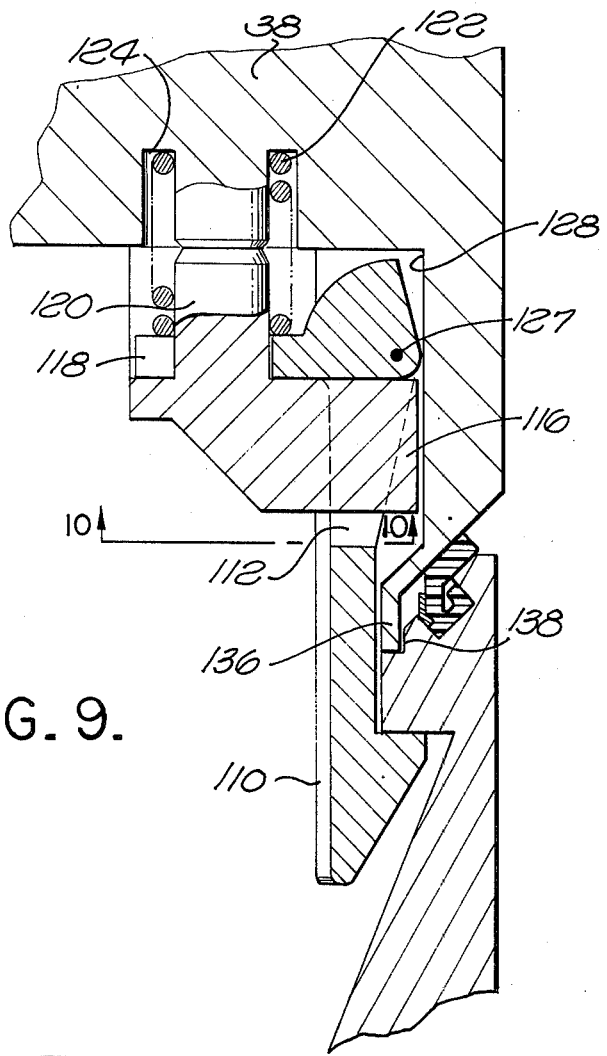
FIG. 9 is a fragmentary cross-sectional view of an alternative latch mechanism which may be used with the present invention.
Figure 10:
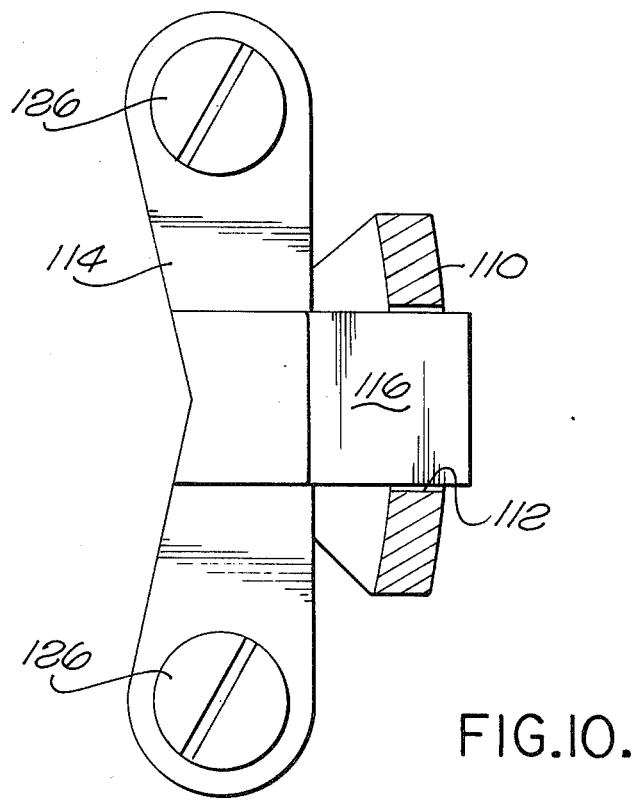
FIG. 10 is a cross-sectional view of the latch of FIG. 9 taken about the lines 10—10 thereof.

By reference to FIGS. 9 and 10, an alternative latch means useful in the apparatus of the present invention is shown. The latch finger 110 defines an opening 112 therein. A mounting frame 114 includes a protruding arm 116 which extends through the opening 112. The finger 110 includes a pair of arms (one of which is shown at 118) extending therefrom. The arms fit one on each side of a circular pin 120 extending from the frame 114. A spring 122 is received within a circular groove 124 defined by the central support base 38 and encircles the pin 120 and abuts the arms 118. The frame 114 is secured to the base 38 by screws 127 or the like thus securing the latch finger in position. By such construction, the pivot point 126 is spaced toward the wall 128 of the base 38 allowing the detent 132 to be constructed without an undercut or reverse draft.

Also shown is an alternative stop means including a lip or protrusion 136 which seats in an internal groove or recess 138. The lip and groove may extend substantially around or only slightly around the central support base 38 and housing 10 respectively. It will be noted that such arrangement provides radial alignment and stability of the module with respect to the housing.

There has thus been disclosed a fuel receiver for utilization with a tank which may be utilized in either the closed circuit or gravity feed systems of refueling. An unobstructed opening is provided through the utilization of a swing-away module pivotally connected to a tubular body member capable of receiving a refueling nozzle.

What is claimed is:

1. A fuel receiver providing gravity and closed circuit refueling capability comprising:
   A. a tubular body;
   B. a swing-away module having a fluid flow path therethrough and including nipple means for receiving a refueling nozzle and valve shut-off means operative to open and close said path;
   C. means pivotally attaching said swing-away module to said body; and
   D. latch means releasably securing said swing-away module to said body, whereby said valve shut-off means is operatively positioned in said flow path during the time said module is secured to said body, and upon release of said latch means said module swings away from said body to provide a substantially unimpeded flow path through said body.

2. A fuel receiver as defined in claim 1 wherein said latch means includes a latch finger operable from externally of said receiver.

3. A fuel receiver as defined in claim 2 which further includes a lanyard affixed to said module and extending through said body for returning said module to a latched position.

4. A fuel receiver as defined in claim 2 wherein said latch finger is pivotally affixed to said module.

5. A fuel receiver as defined in claim 1 wherein said body includes a flange for attaching said receiver to a fuel tank.

6. A fuel receiver as defined in claim 1 which further includes sealing means disposed between said body and said module along the line of contact therebetween.

7. A fuel receiver as defined in claim 6 wherein said sealing means is a flexible member carried by a metal ring inserted within a groove in said body.

8. A fuel receiver having a fluid flow path therethrough and providing gravity and closed circuit refueling capability comprising:
   A. a housing member including
      1. a tubular body having first and second ends,
      2. a radially outwardly extending flange at said first end for affixing said receiver to a fuel tank,
      3. a first hinge member at said second end;
   B. a nipple member including
      1. an elongated tubular nipple disposed internally of said tubular body and extending from said second end toward said first end thereof to receive a refueling nozzle,
      2. a central support base,
      3. second hinge member on said central support base;
   C. means pivotally interconnecting said first and second hinge members thereby to permit said nipple member to be pivoted about an axis transverse to the longitudinal axis of said body and to remove said tubular nipple from said tubular body of said housing;
   D. latch means on said second end of said body and said central support base on said nipple member to secure said nipple member and said housing member together in axially aligned relationship; and
   E. valve shut-off means secured to said central support base on said nipple and extending in a direction opposite said elongated tubular nipple, whereby said valve shut-off means is operatively positioned in said flow path during the time said nipple member is secured to said housing member to open and close said flow path, and upon release of said latch means said nipple member swings away from said tubular body second end to provide a substantially unimpeded flow path through said receiver.

9. A fuel receiver as defined in claim 8 wherein said body at said second end defines a groove extending continuously therearound, sealing means removably secured within said groove, said central support base having a lip along the periphery thereof, said lip engaging said sealing means when said nipple is latched to said housing.

10. A fuel receiver as defined in claim 9 wherein said sealing means includes a metallic ring carrying a resilient member extending outwardly from said groove to engage said lip, said lip being disposed at an angle other than 90° with respect to the longitudinal axis of said body.

11. A fuel receiver as defined in claim 9 wherein said body defines a first stop means adjacent said groove and said central support base defines a second stop means adjacent said lip, said stop means being in engagement when said module is latched and said fuel receiver is in a closed circuit capability.

12. A fuel receiver as defined in claim 11 wherein said first and second stop means include enlarged peripheral areas on said body and said lip respectively.

13. A fuel receiver as defined in claim 11 wherein said first stop means includes an internally disposed recess and said second stop means includes a downwardly extending protrusion seating in said recess.

14. A fuel receiver as defined in claim 8 further including a removable cap closing said first end of said body, a lanyard extending through said body and secured at one end thereof to said cap and at the opposite end thereof to said central support base at a point adjacent to but displaced radially inwardly from said second hinge, said lanyard being used to swing said nipple member into latched engagement with said housing and to retain said cap with said receiver.

15. A fuel receiver as defined in claim 8 wherein said latch means includes a latch finger pivotally secured to said central support base on said nipple and extending toward said first end of said body when said nipple member is latched to said housing, a detent defined by a recess in the inner wall of said body adjacent said second end thereof, an ear extending from said latch finger to engage said detent, spring means affixed to said latch finger for continuously urging said finger toward said detent.

16. A fuel receiver as defined in claim 8 wherein said pivot axis of said pivotally interconnecting means is disposed at an angle displaced from the vertical whereby upon release of said latch means said nipple member and valve shut-off means together pivot about said pivot axis responsive to the force of gravity only.

* * * * *